US012408648B2

(12) United States Patent
Jalowiec

(10) Patent No.: US 12,408,648 B2
(45) Date of Patent: Sep. 9, 2025

(54) METHOD OF TRAPPING TICKS

(71) Applicant: Tick Sticker LLC, Boca Raton, FL (US)

(72) Inventor: Thomas Walter Jalowiec, Sauquoit, NY (US)

(73) Assignee: TICK STICKER LLC, Boca Raton, FL (US)

(*) Notice: Subject to any disclaimer, the term of this patent is extended or adjusted under 35 U.S.C. 154(b) by 0 days.

(21) Appl. No.: 15/872,697

(22) Filed: Jan. 16, 2018

(65) Prior Publication Data

US 2018/0242568 A1 Aug. 30, 2018

Related U.S. Application Data

(62) Division of application No. 15/715,481, filed on Sep. 26, 2017.

(60) Provisional application No. 62/518,849, filed on Jun. 13, 2017, provisional application No. 62/529,064, filed on Jul. 6, 2017, provisional application No. 62/551,658, filed on Aug. 29, 2017, provisional application No. 62/463,887, filed on Feb. 27, 2017.

(51) Int. Cl.
*A01M 1/14* (2006.01)
*A01M 1/02* (2006.01)
*A01M 1/10* (2006.01)

(52) U.S. Cl.
CPC .............. *A01M 1/14* (2013.01); *A01M 1/02* (2013.01); *A01M 1/103* (2013.01); *A01M 1/10* (2013.01); *A01M 2200/011* (2013.01); *Y02A 50/30* (2018.01)

(58) Field of Classification Search
CPC .......... A01M 1/00; A01M 1/02; A01M 1/023; A01M 1/10; A01M 1/103; A01M 1/14
USPC ................................ 43/107, 114, 121, 132.1
See application file for complete search history.

(56) References Cited

U.S. PATENT DOCUMENTS 2,911,756 A * 11/1959 Geary .................... A01M 1/02
43/114
3,094,805 A * 6/1963 Luck .................... A01M 25/004
43/131
3,685,199 A * 8/1972 Bradshaw ............. A01M 1/145
43/114
3,729,858 A * 5/1973 Bradshaw ............... A01M 1/14
43/114

(Continued)

FOREIGN PATENT DOCUMENTS

CN         1079636        12/1997
CN       103314938 A   *  9/2013
(Continued)

OTHER PUBLICATIONS

Translation of CN 106818674 (Year: 2017).*
(Continued)

*Primary Examiner* — Darren W Ark
(74) *Attorney, Agent, or Firm* — Jeffrey S. Melcher; Melcher Patent Law PLLC

(57) ABSTRACT

Provided is a method of trapping ticks using a tick trap having a glue constructed to trap ticks touching the glue by sticking to the ticks, and a plant based scent formed from a part of a plant that attracts ticks to the glue, the method includes placing the trap on a location surface and using the tick attractant to attract ticks to the glue.

35 Claims, 14 Drawing Sheets

(56) References Cited

U.S. PATENT DOCUMENTS

| | | | | |
|---|---|---|---|---|
| 3,755,958 A * | 9/1973 | Bradshaw | A01M 1/02 | 43/114 |
| 3,863,384 A * | 2/1975 | Weatherston | A01M 1/14 | 43/114 |
| 3,913,259 A * | 10/1975 | Nishimura | A01M 1/02 | 43/114 |
| 4,156,321 A * | 5/1979 | Capizzi | A01M 1/14 | 43/114 |
| 4,161,079 A * | 7/1979 | Hill | A01M 23/005 | 43/114 |
| 4,208,828 A * | 6/1980 | Hall | A01M 1/02 | 43/114 |
| 4,815,231 A * | 3/1989 | McQueen | A01M 1/14 | 43/114 |
| 4,933,371 A | 6/1990 | Hink | | |
| 4,992,268 A * | 2/1991 | Landolt | A01M 1/02 | 424/407 |
| 5,031,354 A * | 7/1991 | Olson | A01M 1/02 | 43/114 |
| 5,119,586 A * | 6/1992 | Townsend | A01M 1/023 | 43/114 |
| 5,123,201 A * | 6/1992 | Reiter | A01M 1/026 | 43/107 |
| 5,189,830 A * | 3/1993 | Montemurro | A01M 1/023 | 43/121 |
| 5,258,176 A * | 11/1993 | Keenan | 424/84 | |
| 5,381,557 A * | 1/1995 | Luria | A01M 1/14 | 2/16 |
| 5,454,186 A * | 10/1995 | Gang | A01M 1/02 | 43/114 |
| 5,461,822 A * | 10/1995 | Green | A01M 1/02 | 43/107 |
| 5,572,825 A * | 11/1996 | Gehret | A01M 1/02 | 229/120.11 |
| 5,839,221 A * | 11/1998 | Ron | A01M 1/02 | 43/132.1 |
| 5,907,923 A * | 6/1999 | Heath | A01M 1/02 | 43/107 |
| 5,939,062 A * | 8/1999 | Heath | A01M 1/02 | 424/405 |
| 6,138,402 A * | 10/2000 | Wotton | A01M 1/02 | 43/107 |
| 6,155,002 A * | 12/2000 | Holder | A01M 1/14 | 43/114 |
| 6,264,939 B1 * | 7/2001 | Light | A01M 1/02 | 424/84 |
| 6,389,740 B2 * | 5/2002 | Perich | A01M 1/04 | 424/409 |
| 6,415,545 B1 | 7/2002 | Watanabe | | |
| 6,516,558 B1 * | 2/2003 | Lingren | A01M 1/02 | 43/107 |
| 6,528,049 B2 * | 3/2003 | Light | A01M 1/02 | 424/84 |
| 6,920,716 B2 * | 7/2005 | Kollars, Jr. | A01M 1/023 | 43/107 |
| 7,073,287 B2 * | 7/2006 | Lau | A01M 1/02 | 43/107 |
| 7,434,351 B2 * | 10/2008 | Bette | A01M 1/106 | 43/107 |
| 7,856,752 B1 * | 12/2010 | Eilersen | A01M 23/005 | 43/114 |
| 8,104,223 B1 * | 1/2012 | Rodriguez | A01M 1/14 | 43/114 |
| 8,109,035 B2 * | 2/2012 | Bowden | A01M 1/106 | 43/107 |
| 8,240,081 B2 * | 8/2012 | Cuellar Bernal | A01M 1/145 | 43/107 |
| 8,402,690 B2 * | 3/2013 | Schneidmiller | A01M 1/103 | 43/121 |
| 8,424,239 B1 * | 4/2013 | Gallo | A01M 1/223 | 43/112 |
| 8,793,927 B2 * | 8/2014 | Winkler | A01M 1/14 | 43/107 |
| 8,978,290 B2 * | 3/2015 | Wright | A01M 1/02 | 43/113 |
| 9,012,385 B2 * | 4/2015 | Di Biase | C08F 220/68 | 508/463 |
| 9,066,508 B2 * | 6/2015 | Aroniss | A01M 1/106 | |
| 9,307,755 B1 * | 4/2016 | Bassan, Jr. | A01M 1/2094 | |
| 9,681,652 B2 * | 6/2017 | Petersen | A01M 1/02 | |
| 10,098,337 B2 * | 10/2018 | Yans | A01M 1/14 | |
| 2002/0132020 A1 | 9/2002 | Lillig | | |
| 2004/0216366 A1 * | 11/2004 | Ritchie | A01M 1/026 | 43/114 |
| 2005/0144831 A1 * | 7/2005 | Knauf | A01M 1/02 | 43/107 |
| 2005/0238713 A1 * | 10/2005 | Kollars, Jr. | A01M 1/023 | 424/466 |
| 2006/0016120 A1 * | 1/2006 | Masters | A01M 1/023 | 43/114 |
| 2006/0150473 A1 | 7/2006 | Bette | | |
| 2006/0198857 A1 * | 9/2006 | Casagrande | A01M 1/02 | 424/405 |
| 2006/0283075 A1 * | 12/2006 | Feldhege | A01M 1/02 | 43/114 |
| 2007/0004686 A1 * | 1/2007 | Bengtsson | A01N 31/04 | 514/159 |
| 2007/0094915 A1 * | 5/2007 | Plato | A01M 1/02 | 43/114 |
| 2008/0052982 A1 * | 3/2008 | Windsor | A01M 1/14 | 43/114 |
| 2008/0086932 A1 | 4/2008 | Cook | | |
| 2009/0071059 A1 * | 3/2009 | Della Torre | A01M 1/145 | 43/114 |
| 2009/0223115 A1 * | 9/2009 | Lang | A01M 1/023 | 43/114 |
| 2009/0260276 A1 | 10/2009 | Kirsch | | |
| 2010/0154290 A1 * | 6/2010 | Fisher | A01M 1/02 | 43/114 |
| 2012/0055075 A1 * | 3/2012 | Winkler | A01M 1/02 | 43/114 |
| 2012/0124888 A1 * | 5/2012 | Lemberg | A01M 1/14 | 43/107 |
| 2012/0285076 A1 * | 11/2012 | Banfield | A01M 1/026 | 43/123 |
| 2013/0111802 A1 * | 5/2013 | Oehlschlager | A01M 1/14 | 43/114 |
| 2013/0340315 A1 * | 12/2013 | Gustafson | A01M 31/06 | 43/2 |
| 2014/0105952 A1 | 4/2014 | Gilbert | | |
| 2014/0242199 A1 | 8/2014 | Manhas | | |
| 2014/0290123 A1 * | 10/2014 | Duff | A01M 1/02 | 43/114 |
| 2016/0066555 A1 * | 3/2016 | Yans | A01M 1/14 | 43/114 |
| 2016/0073622 A1 * | 3/2016 | Jany | A01N 25/006 | 43/131 |
| 2016/0120164 A1 * | 5/2016 | Li | A01M 1/14 | 43/114 |
| 2017/0094960 A1 * | 4/2017 | Sasaki | H02S 40/38 | |
| 2018/0242567 A1 * | 8/2018 | Jalowiec | A01M 1/10 | |
| 2019/0000062 A1 * | 1/2019 | Yans | A01M 1/14 | |
| 2019/0327952 A1 * | 10/2019 | Jalowiec | A01M 1/14 | |
| 2021/0045378 A1 * | 2/2021 | Kutila | A01M 1/023 | |

FOREIGN PATENT DOCUMENTS

| | | |
|---|---|---|
| CN | 106818674 A * | 6/2017 |
| JP | 3205736 B2 | 9/2001 |
| JP | 3878366 B2 | 2/2007 |
| JP | 3163352 | 9/2010 |
| JP | 3163352 U | 10/2010 |

(56) References Cited

FOREIGN PATENT DOCUMENTS

| JP | 5 121228 | 1/2013 |
|---|---|---|
| KR | 2003 0026067 | 3/2003 |

OTHER PUBLICATIONS

Translation of CN 103314938 (Year: 2013).*
Tick Catcher Sheet, Japan Made, https://japanmade.co.jp/product/tick-catcher-sheet/, 2017, pp. 1-7.
Tick, Wikipedia, https://en.wikipedia.org/wiki/Tick, 2018, pp. 1-10.
Mites that Bug People, https://content.ces.ncsu.edu/mites-that-bug-people, Jun. 1, 2015, pp. 1-8.
Mite, Wikipedia, https://en.wikipedia.org/wiki/Mite, 2018, pp. 1-9.
"DIY Homemade Natural Tick Repellant Recipies," www.tickbites.net/diy-homemade-natural-tick-repellant-recipies/, Aug. 2017, pp. 1-12.
Grunert, "Natural Home Remedy Tick Repellant," www.herbs.lovetoknow.com/Natural_Home_Remedy_Tick_Repellant, Aug. 2017, pp. 1-3.
Bauer, "5 Natural Bug Repellants that Actually Work," www.cheatsheet.com/life/5-natural-bug-repellants-that-actually-work.html, Aug. 2017, pp. 1-7.
Fabio, "Repellent effect of sweet basil compounds on *Ixodes ricinus* ticks," www.ncib.nlm.nih.gov/pubmed/18670893, Aug. 2008, p. 1.
"Plants that help control ticks," May 2013, www.masterplanlandscapedesignpa.com, pp. 1-6.
Catchmaster fold up trap, http://www.catchmaster.com/wpcproduct/mouse-insect-glue-boards/, pp. 1-2, 2010.
"Scientists Says Popular Shrub Linked to Lyme Disease," Pest Control Technology, Oct. 3, 2017, pp. 1-3, http://www.pctonline.com/article/scientists-poular-shrub-lyme disease-tick/?isid=MzQyNDQ2Mw%3d%3d.
Invitation to Pay Additional Fees and where applicable protest fee, issued in PCT/US18/13806, Apr. 23, 2018, pp. 1-12.
Protest and Response to Invitation to Pay Additional Fees and where applicable protest fee, issued in PCT/US18/13806, Apr. 26, 2018, pp. 1-4.
International Search Report issued in PCT/US18/13806, Jun. 21, 2018, pp. 1-13.
Final Office Action issued in Tick Sticker trademark registration No. 87868112, Mar. 8, 2019.
Buggy Beds, Jun. 21, 2019, pp. 1-5, https://buggybeds.com/collections/all.
Pest-Control Tokyo Kikaku Hanbai Co., Ltd., Jun. 21, 2019, Tick Trap Sheet, p. 1.
Response to Written Opinion filed in PCT/US18/13806, Mar. 4, 2019, pp. 1-42.
Written Opinion isssued in PCT/US18/13806, Jan. 28, 2019, pp. 1-9.
International Search Report and Written Opinion issued in PCT/US2019/056424, Mar. 18, 2020, pp. 1-25.
Bayala et al. "Chemical Composition, Antioxidant, Anti-Inflammatory and Anti-Proliferative Activities of Essential Oils of Plants from Burkina Faso" PLOS ONE. Mar. 24, 2014 (Mar. 24, 2014) vol. 9, p. 1-11; p. 1, abstract.
Invitation issued in PCT/US19/56424, Dec. 17, 2019, pp. 1-2.
Protest filed in PCT/US19/56424, Jan. 10, 2020, pp. 1-3.
Notification issued in PCT/US19/56424, Feb. 12, 2020, pp. 1-3.
Request for Supervisory Review filed in PCT/US19/56424, Jan. 17, 2020, pp. 1-7.
European Search Report issued in corresponding EP patent application 18 75 8103, Nov. 25, 2020, pp. 1-6.
Office Action issued in corresponding Indian Patent Application Serial No. 201937037173, Sep. 7, 2021, pp. 1-11.
Office Action issued in corresponding Chinese Patent Application Serial No. 201880014244.1, Mar. 23, 2021, pp. 1-9, including translation.

* cited by examiner

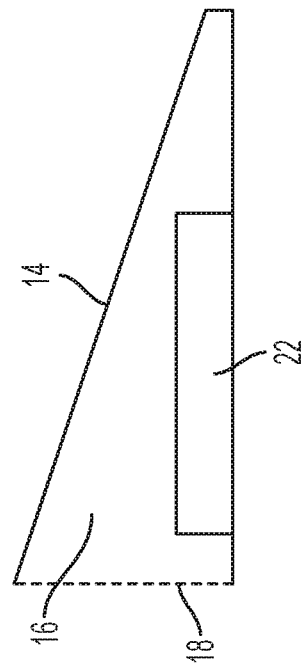
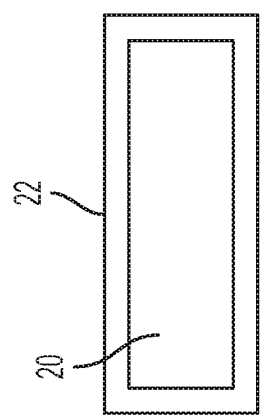
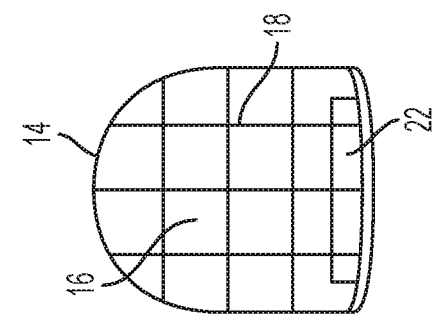
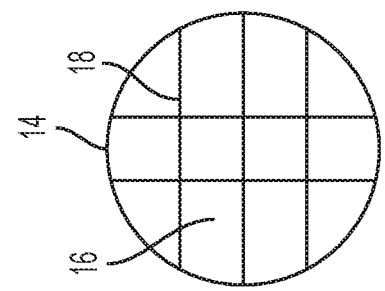

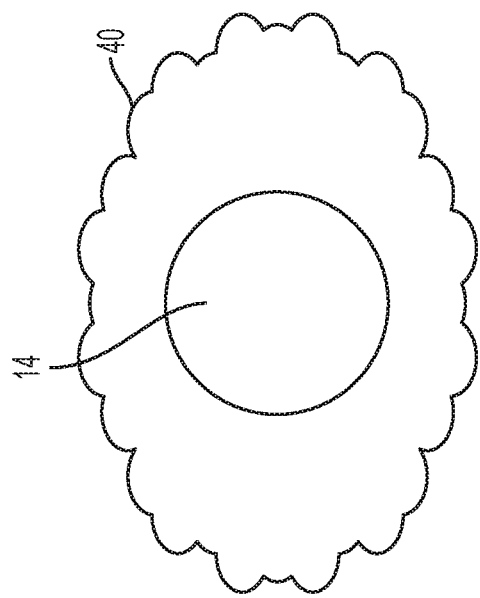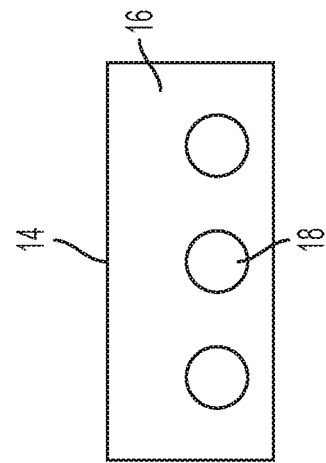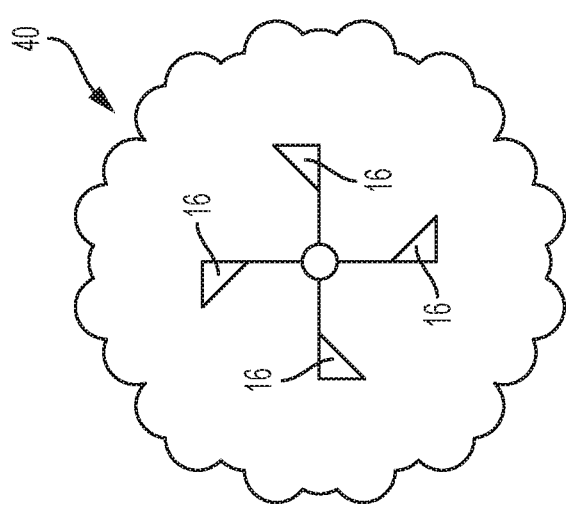

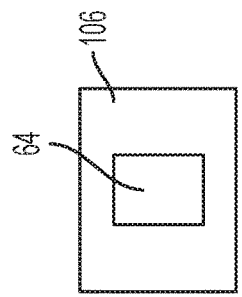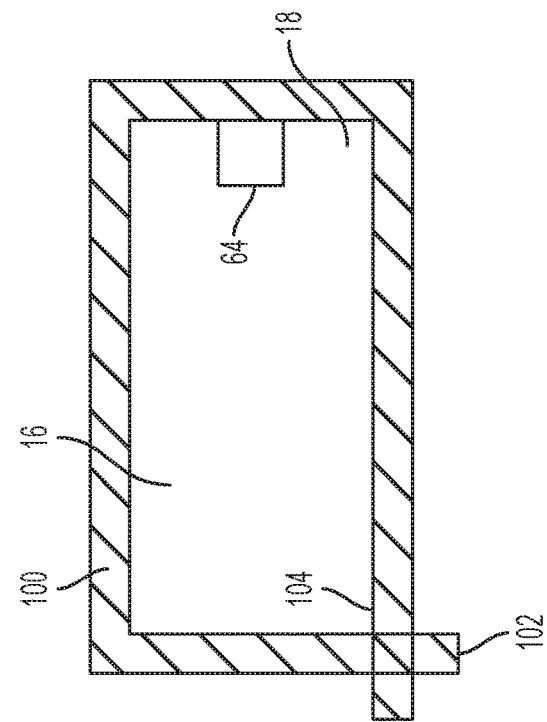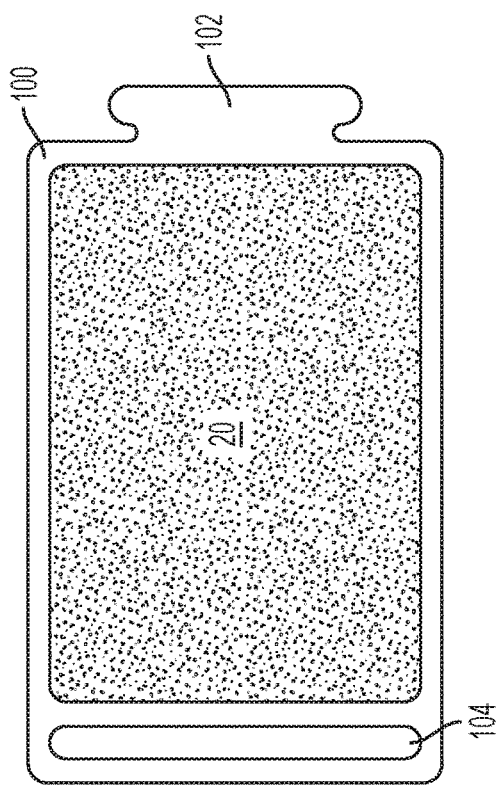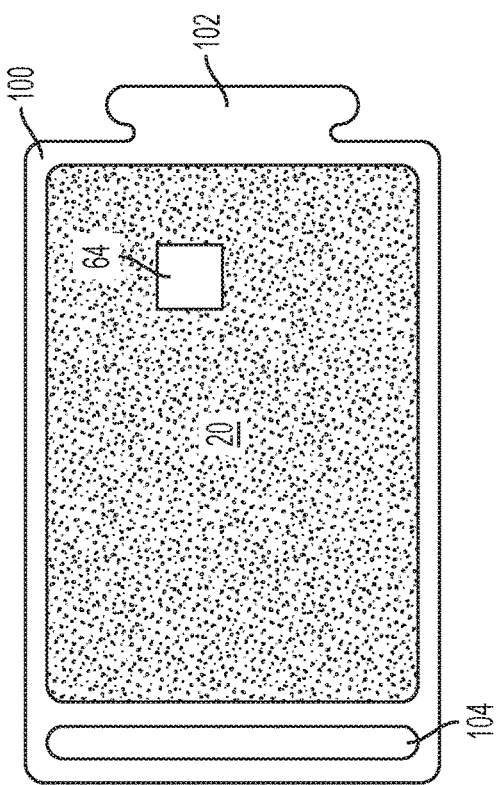
FIG. 16B
FIG. 16D
FIG. 16A
FIG. 16C

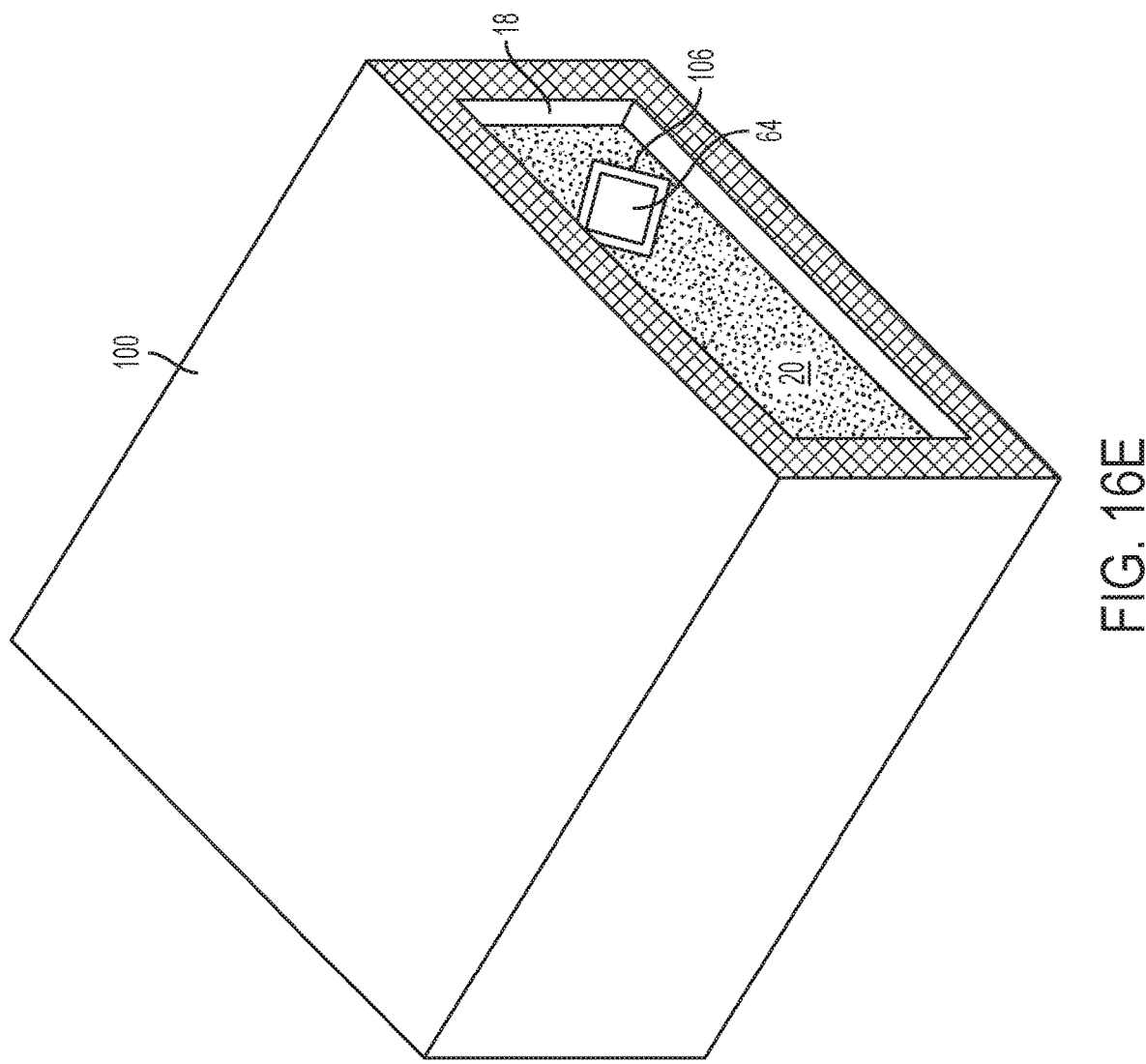

METHOD OF TRAPPING TICKS

FIELD OF THE INVENTION

The invention relates to a method of trapping ticks.

BACKGROUND OF THE INVENTION

Lyme disease is carried by ticks. Lyme disease can cause death in pets, especially dogs. Lyme disease can cause severe problems in humans. It is estimated that about 300,000 people a year in the U.S. and 65,000 people a year in Europe become infected with Lyme disease.

Ticks are also carriers of diseases such as Rocky Mountain Spotted fever, anaplasmosis, Q fever, hemorrhagic fever, Powassan virus, and encephalitis.

One attempted solution is to spray various poisons to kill the ticks. Spraying poisons, however, has an adverse effect on the environment and is potentially dangerous to humans, mammals and beneficial insects such as bees.

U.S. Pat. No. 5,189,830 discloses a tick trap having a raised base having inclined walls at each end, an upper portion having sticky tick trapping surface and an upwardly extending box-like portion having a plurality of holes around the lower surface thereof, a rectangular rain guard extending outwardly from the box at a spaced distance from the surface of the base and a hinged lid over the open end of the box. The box includes a carbon dioxide canister which is periodically activated by batteries to emit carbon dioxide from the portholes about the box to attract ticks onto the sticky surface (glue) where they are destroyed. This product and method are not efficient and simply are not effective.

SUMMARY OF THE INVENTION

An objective of the invention is to provide an efficient tick trap and method that does not require batteries, can be utilized continuously, and have directional attraction of ticks.

Another objective of the invention is method of providing a tick reduced safe area where pets and humans can enjoy the outdoors with reduced fear of being bitten by a tick.

The objectives of the invention and other objectives can be obtained by a method of trapping ticks comprising:
  placing a tick trap at a location to trap ticks, the tick trap comprising:
    a support;
    a glue on the support, the glue is constructed to trap ticks touching the glue by sticking to the ticks; and
    a tick attractant comprising a plant based scent formed from a part of a plant; and,
  the plant based scent attracting ticks to the glue so that ticks contact the glue and become trapped by the glue.

The objectives of the invention can also be obtained by a method of trapping ticks comprising:
  folding a support to provide a housing having at least one side opening and inside surfaces defining a protective enclosure, a glue being on at least one inside surface, the glue is constructed to trap ticks touching the glue by sticking to the ticks, a tick attractant is incorporated in the glue, is on the glue, is on the support, or is on the housing and the tick attractant comprising a plant based scent formed from a part of a plant;
  placing the housing on a location surface to trap ticks; and
  the plant based scent attracting ticks so that ticks walk from the location surface through the side opening directly into the protective enclosure and contact the glue, wherein the glue traps the ticks.

The objectives of the invention can further be obtained by a method of trapping ticks comprising:
  providing a housing having at least one side opening and inside surfaces defining a protective enclosure;
  providing a support constructed to be removably inserted into the housing, a glue being on support, the glue is constructed to trap ticks touching the glue by sticking to the ticks, a tick attractant is incorporated in the glue, is on the glue, is on the support, or is on the housing, and the tick attractant comprising a plant based scent formed from a part of a plant;
  placing the housing on a location surface to trap ticks; and
  the plant based scent attracting ticks so that ticks walk from the location surface through the side opening directly into the protective enclosure and contact the glue, wherein the glue traps the ticks.

BRIEF DESCRIPTION OF THE DRAWINGS

FIG. 2 illustrates a top view of an example of a glue trap.

FIG. 3 illustrates a side view of an example of a tick trapping chamber containing a glue trap.

FIG. 4 illustrates a side view of an example of a tick trapping chamber containing a glue trap.

FIG. 5 illustrates a view of an opening in an example of a tick trapping chamber in the shape of a cone of FIG. 1.

FIG. 6 illustrates a view of an opening in an example of a tick trapping chamber in a cone of FIG. 3 and tube of FIG. 4 each having a flat bottom for containing a glue trap.

FIGS. 12A and 12B illustrate different tick tapping chambers that disperse the carbon dioxide in all directions.

FIG. 12C illustrates multiple openings into the trick trap.

FIG. 16A illustrates a foldable tick trap in an unfolded position. FIG. 16B illustrates a packaged attractant. FIG. 16C illustrates the unfolded tick trap having the attractant applied. FIG. 16D illustrates a folded tick trap. FIG. 16E illustrates a folded tick trap.

DETAILED DESCRIPTION OF THE INVENTION

The invention will be explained with reference to the attached non-limiting FIGS. 1-16.

Figure 1:
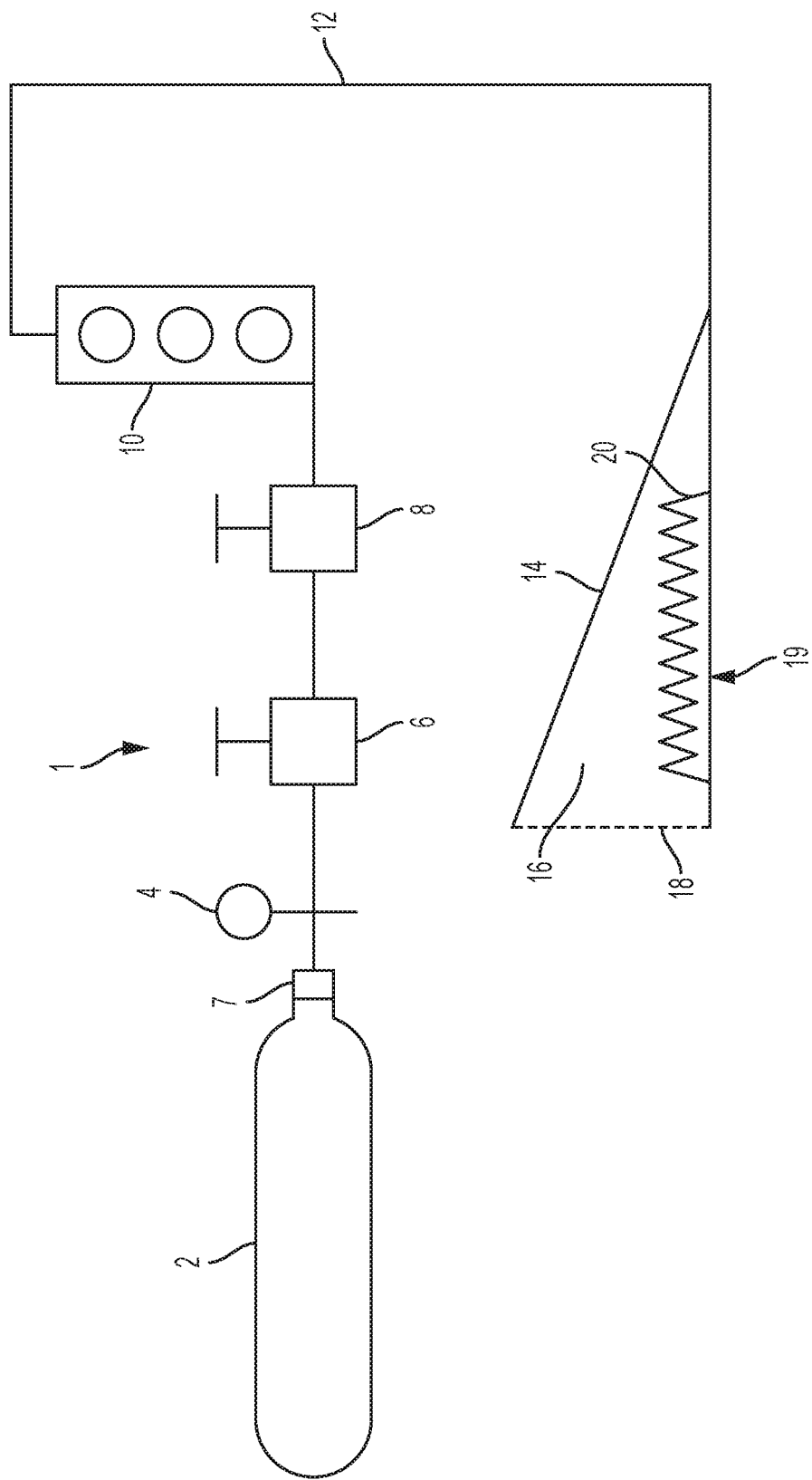
FIG. 1 illustrates an example of a tick trap.

As shown in FIG. 1, the tick trap 1 comprises a canister 2 containing carbon dioxide 40, a canister connector 7 constructed to connect to the canister 2, an optional pressure gauge 4 for measuring the pressure within the canister 2, an optional shut off valve 6, a mechanical metering valve 8 constructed to regulate the flow of carbon dioxide 40 from the canister 2, an optional bubbler 10 through which the carbon dioxide 40 flows in the form of bubbles to measure the amount of flow, a tube 12 connecting the bubbler 10 to a tick trapping chamber 16 defined by a walled structure 14 having an opening 18, and a tick capture structure 19.

Canisters 2 for containing carbon dioxide are now well know. Examples of canisters 2 are paintball CO2 canisters, CO2 cartridges, carbonators for soda machines, and conventional canisters, such as those sold by www.airgas.com. Any suitable canister 2 can be utilized. In general, the larger the capacity the greater the number of tick trapping chambers 16 that can be connected to the same canister 2 and the longer the time the tick trap 1 can be run. Preferably, the canister 2 contains a valve 3 so that if the canister connector 7 is not present on the canister 2 the valve 3 prevents release of the carbon dioxide 40 from the canister 2. Most of the paintball canisters 2 and other canisters 2 have such a valve 3 already mounted on the canister 3.

Canister connectors 7 are now well know. Any suitable connector 7 for connecting the canister 2 to the system can be utilized.

Tubing between the canister 2 and the mechanical metering valve 8 should high pressure tubing suitable for use with pressurized carbon dioxide 40. Such high pressure tubing is now well known and any suitable high pressure tubing can be used. Examples of suitable high pressure tubing include plastic or steel tubing. The tubing to transport the carbon dioxide 40 flowing from the mechanical metering valve 8 can be any suitable low pressure tubing, such as flexible or rigid aquarium tubing, for example acrylic or vinyl tubing. The size of the tubing will depend on the size of the connectors for each of the structures in the system. One skilled in the art will easily be able to select a suitable size tubing, for example, ⅛, ¼, 5/16, ⅜, ½, ¾, or 1 inch diameter tubing.

The supply of carbon dioxide 40 from the canister 2 to the tick trapping chamber 16 can be conducted by modifying known aquarium carbon dioxide systems. Aquariums use a mechanical needle valve (metering valve) and bubbler attached to a canister containing carbon dioxide to supply carbon dioxide to the water for plant growth. These known carbon dioxide systems can now be modified for use in the claimed tick trap 1.

A pressure gauge 4 to identify the amount of carbon dioxide 40 left in the canister 2 can be used. Pressure gauges are now well known and any suitable pressure gauge 4 can utilized. The pressure gauge should be connected between the canister 2 and the mechanical metering valve 8.

An optional shut off valve 6 can be connected to the canister 2 to shut off the carbon dioxide 40 flow without having to change the setting on the mechanical metering valve 8.

The mechanical metering valve 8 is constructed to provide a low flow of carbon dioxide 40 from the canister 2. For outside the U.S., examples of suitable mechanical metering valves 8 include those sold by WYIN, such as WYIN W00-01C, WYIN JIS M22-14 mechanical needle valve to adjust the amount of carbon dioxide supplied from the canister. The connectors on these metering valves can be used in the U.S. by converting the size of the connector using adapters. Mechanical metering valves 8 conventionally used to control the flow rate of carbon dioxide for aquarium use can be utilized in the present invention.

A bubbler 10 can be connected to the mechanical metering valve 8 using low pressure tubing to visually measure the flow rate of the carbon dioxide 40. Bubblers 10 are now well known and any suitable bubbler can be utilized. The bubbler 10 comprises a vessel that is either clear or has a clear window that is filled with a liquid and has an input connector on the bottom and an exit connector on the top. The carbon dioxide 40 flows through the liquid in the form of bubbles. The greater the number of bubble per minute identifies a greater flow rate. When using a bubbler 10, the flow rate can be any desired rate based on the bubbles per second. The flow rate can be adjusted to account for the surroundings and the type of ticks. For example, a higher flow rate can be first utilized to attract ticks, and then subsequently reduced by trial and error to determine a minimum flow rate to still attract the ticks to maximize the run time of the canister 2. A preferred flow rate is the minimum to attract ticks to maximize the length of use for the canister 2.

The tick trapping chamber 16 can be connected to the mechanical metering valve 8 directly or through the optional bubbler 10. The tick trapping 16 is defined by a walled structure 14. The tick trapping chamber 16 comprises an opening 18 that allows the carbon dioxide 40 to exit the tick trapping chamber 16. The tick trapping chamber 16 is in communication with a tick capture structure 19. The tick capture structure 19 captures ticks that enter or come near the tick trapping chamber 16. The tick capture structure 19 can be contained within the tick trapping chamber 16 or be near the tick trapping chamber 16.

Figure 10A:
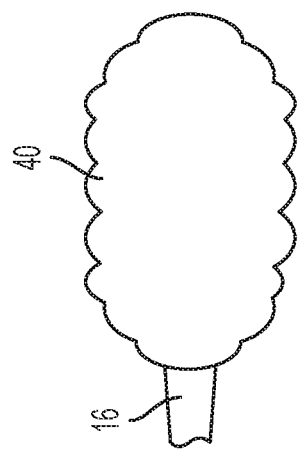
FIGS. 10A and 10B illustrate examples of different angles the carbon dioxide exits the chamber.
Figure 10B:
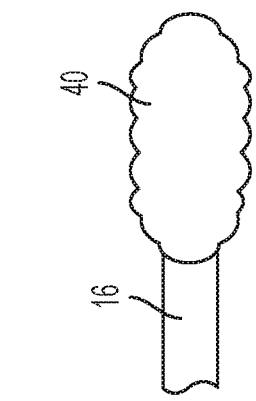

The tick trapping chamber 16 can have any desired shape. Examples of shapes include square, rectangular, triangular, circular, cone, or any other desired shape. Preferably, the tick trapping chamber 16 has the shape of an at least partially tubular, FIG. 4, or at least partially cone shaped FIG. 3. The chamber 16 and opening 18 can be constructed to direct the carbon dioxide 40 flow in a desired direction and/or amount of dispersion. In FIG. 10A, a top view of a chamber 16 in which the walls of the chamber 16 are not angled due to at least the partially tubular shape of the walled structure 14, the carbon dioxide 40 flow is minimally dispersed in a mostly a singular direction. In FIG. 10B, a top view of a chamber 16 in which the walls of the chamber 16 are angled due to the at least partially cone shape of the walled structure 14, the carbon dioxide 40 flow is more dispersed. The angle of the chamber 16 can be any desired angle to provide the desired dispersion. Preferably, there are no openings on the side walls of the walled structure 14, i.e. the opening 18 is preferably in a mostly singular direction as show in FIGS. 8,10A and 10B.

The tick capture structure 19 can be any suitable structure for capturing ticks. Examples of suitable tick capture structures 19 include a sticky surface 20 or a container (second chamber) 30. The sticky surface can be formed from any suitable sticky material, such as those used in fly traps and glue traps 22.

The tick capture structure 19 can be a sticky surface 20 (glue) within the tick trapping chamber 16 as shown in FIG. 1. The tick trapping chamber 16 be sized to contain a commercially sold glue trap 22 as the tick capture structure 19 so that the user can easily purchase and change the glue trap 22 as desired. Glue traps 22 are commercially sold at stores such as Walmart, Home Depot, Lowes, and other stores. Examples of glue traps 22 include Harris, Dead End, Real Kill, Catchmaster, RatGuard, MouseGuard, and similar brands. Examples of glue traps 22 can be from 2-4 inches wide to 4-8 inches long. However, any size glue trap 22 can be used that fits within the tick trapping chamber 16. The tick trapping chamber 16 can be sized to fit any desired glue trap 22. Glue traps 22 for animals can be used to trap the ticks. A glue board refill, such as Zap n trap, which is 18 inches by 10 inches can be cut to a desired size and utilized as the glue trap 22. The glue traps can be replaceable.

Figure 7:
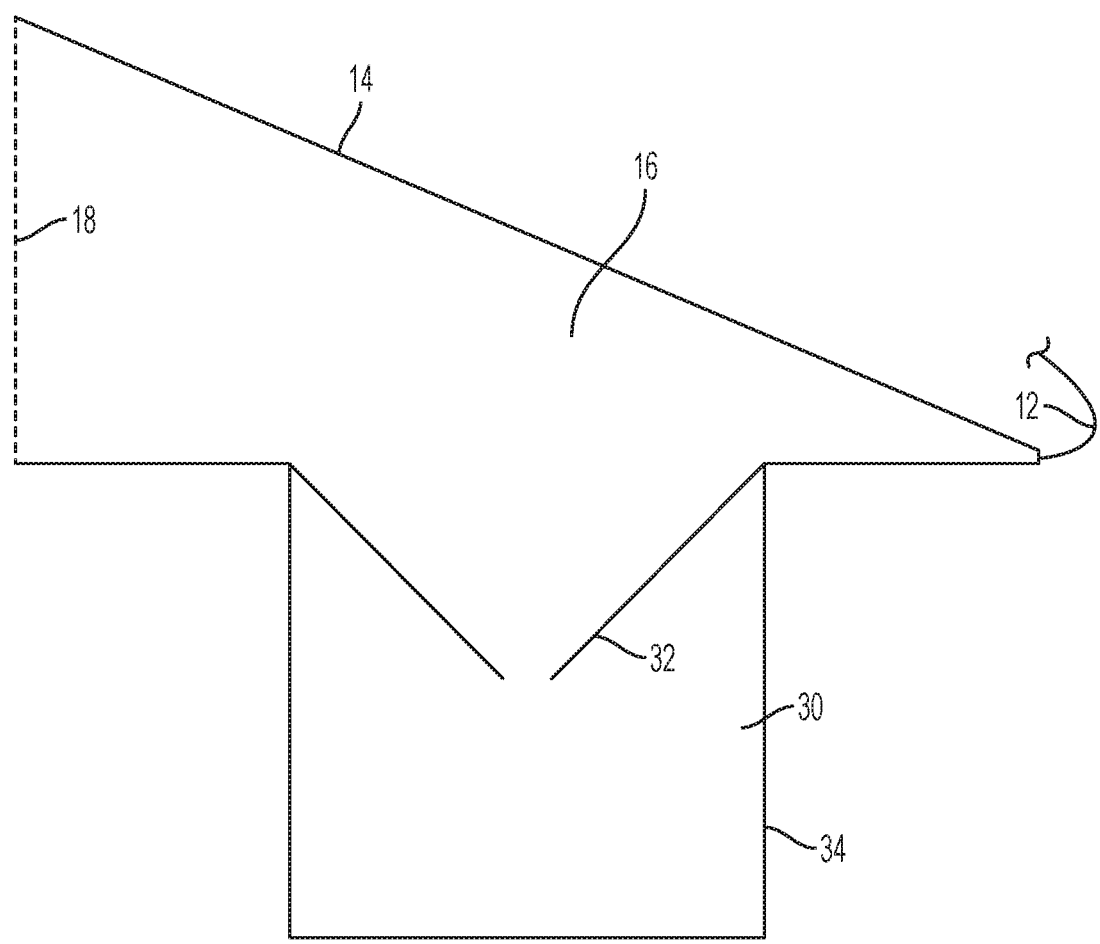
FIG. 7 illustrates a tick trapping chamber connected to a tick capture structure comprising a second chamber.

The tick capture structure 19 can be a container as shown in FIG. 7 from which the ticks have difficulty escaping. FIG. 7 illustrates a second chamber 30 defined by a second walled structure 34. The second walled structure 34 can be a net, bag, jar, or other suitable container for capturing ticks. A sliding surface 32 is constructed so that when ticks contact the sliding surface 32 the ticks slide into the second chamber 30. The sliding surface 32 and walled structure 34 are constructed so that it is more difficult for the ticks to exit the chamber 30 than for the ticks to enter the chamber 30.

Figure 9A:
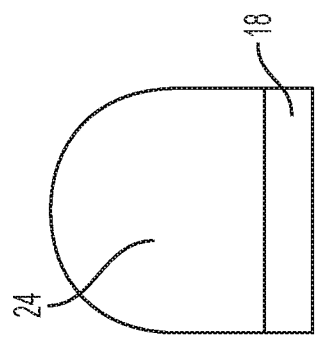
FIGS. 9A, 9B and 9C illustrate examples of different covers.
Figure 9B:
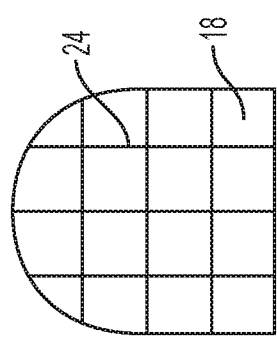
Figure 9C:
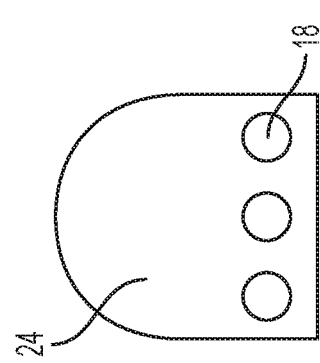

The opening 18 can be numerous small openings, FIG. 9A, a large opening covered by a screen FIG. 9B, a slot FIG. 9C, or any desired opening sized to allow ticks to enter but not larger insects, mammals, and reptiles to prevent them from being undesirably trapped. The opening 18 can be formed by a removable cover 24 that can be removed by a user to access the chamber 16. Thus, the cover 24 can be a screen as shown in FIG. 9B, the cover 24 can have holes as shown in FIG. 9A, or the cover can have a slot as shown in FIG. 9C. Any desired opening shape can be utilized.

Figure 8:
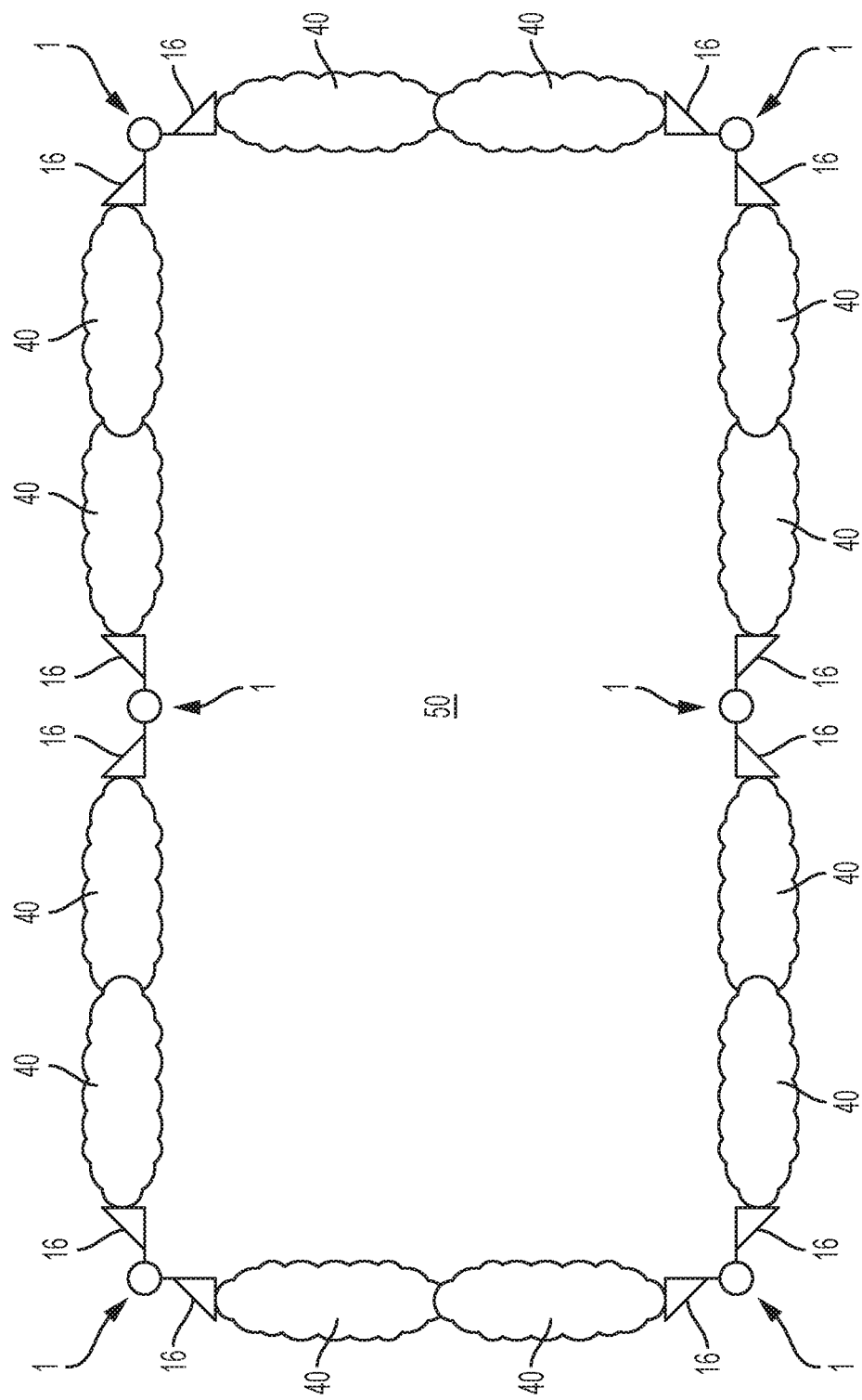
FIG. 8 illustrates tick reduced area surrounded by tick traps.
Figure 11:
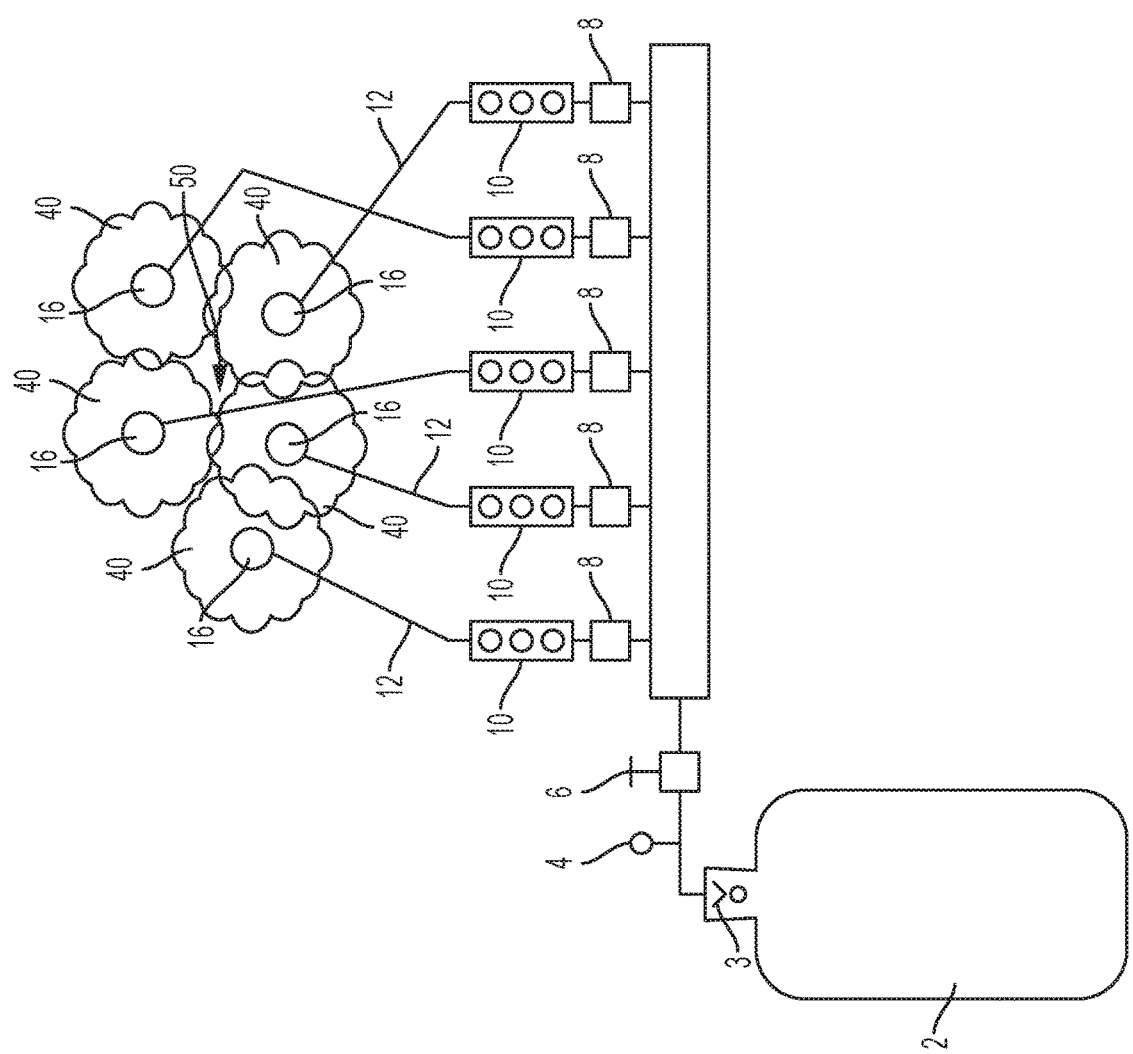
FIG. 11 illustrates an example of a system utilizing a large canister connected to numerous tick trapping chambers to provide a tick reduced zone.

Multiple tick tapping chambers 16 can be connected to the same canister 2 as shown in FIG. 11. Preferably, each tick trapping chamber 16 has an associated tick capture structure 19, bubbler 10, and mechanical metering valve 8. Examples of commercially available multiple micrometering valves 8 include WYIN W00-02 dual head aluminum bubble counter with check valve to prevent return flow from pressure changes, WYIN W02-04 (four valves), WYIN W02-03 (three valves), and WYIN W01-05 (two valves). The tick trapping chambers 16 can be connected to their associated mechanical metering valve 8 by low pressure tubing of any desired length. Thus, the tick trapping chambers 16 can be moved around a desired area to provide a tick reduced area 50 shown in FIG. 11 with overlapping clouds of carbon dioxide 40 or by providing a perimeter as shown in FIG. 8. If desired multiple tick trapping chambers 16 can be connected to a single metering valve 8 as shown in FIG. 12A to provide a cloud of carbon dioxide 40 around the chambers 16. FIGS. 12B and 12A illustrate the top and side views of a tick trapping chamber 16 in which the cloud of carbon dioxide is dispersed around the entire tick trapping chamber 16.

Preferably, the metering valve 8 is a fixed metering valve that cannot be adjusted by the user. For example, the metering valve 8 can be factory adjusted and then locked so that the user cannot adjust the flow rate of the carbon dioxide. Alternatively, the metering valve 8 can be constructed to be non-adjustable.

A dwelling, such as a home, commercial building, or other structure, can be protected by connecting multiple tick traps throughout the dwelling. The multiple tick traps can be connected to a single large canister of carbon dioxide or multiple canisters of carbon dioxide.

The tick traps 1 can be utilized inside dwellings, buildings and any other desired place since the traps 1 can be non-toxic to humans and pets. Thus, tick traps 1 can be placed near doorways to protect dwellings from ticks. For example, a trick trap can be placed in a closet where cloths are kept so that ticks brought in on the cloths can be trapped instead of feeding on mammals inside the dwelling. Preferably, the traps are free of ingredients that are toxic, poisonous, or harmful to humans or pets.

When placing the traps 1 outside, preferably the chamber 16 (also referred to as a protective enclosure) is positioned so that ticks can walk from the ground or grass through the side opening 18 and directly into the chamber 16 to contact the glue 20, 22 at the bottom of the housing 14 or support 100. Grass can be placed at or in the side opening 18 entrance of the chamber 16.

The carbon dioxide 40 can attract ticks from 50 to 75 feet from the tick trapping chamber 16. Thus, a tick reduced area 50 can be formed by providing a plurality of tick trapping chambers 16 around a desired tick reduced area. The tick trapping chambers 16 should be no more than 50 feet from one another, preferably no more than 40 feet from one another, and most preferably no more than 30 feet from one another to provide a swath of carbon dioxide 40 around the tick reduced area 50, as shown in FIG. 8.

Since mosquitoes, and other insects, are attracted to carbon dioxide, the present invention can be utilized for trapping insects other than ticks. For trapping mosquitoes, the second walled structure can be constructed and sized accordingly. Fleas may also be trapped by the different tick traps disclosed herein.

Figure 13A:
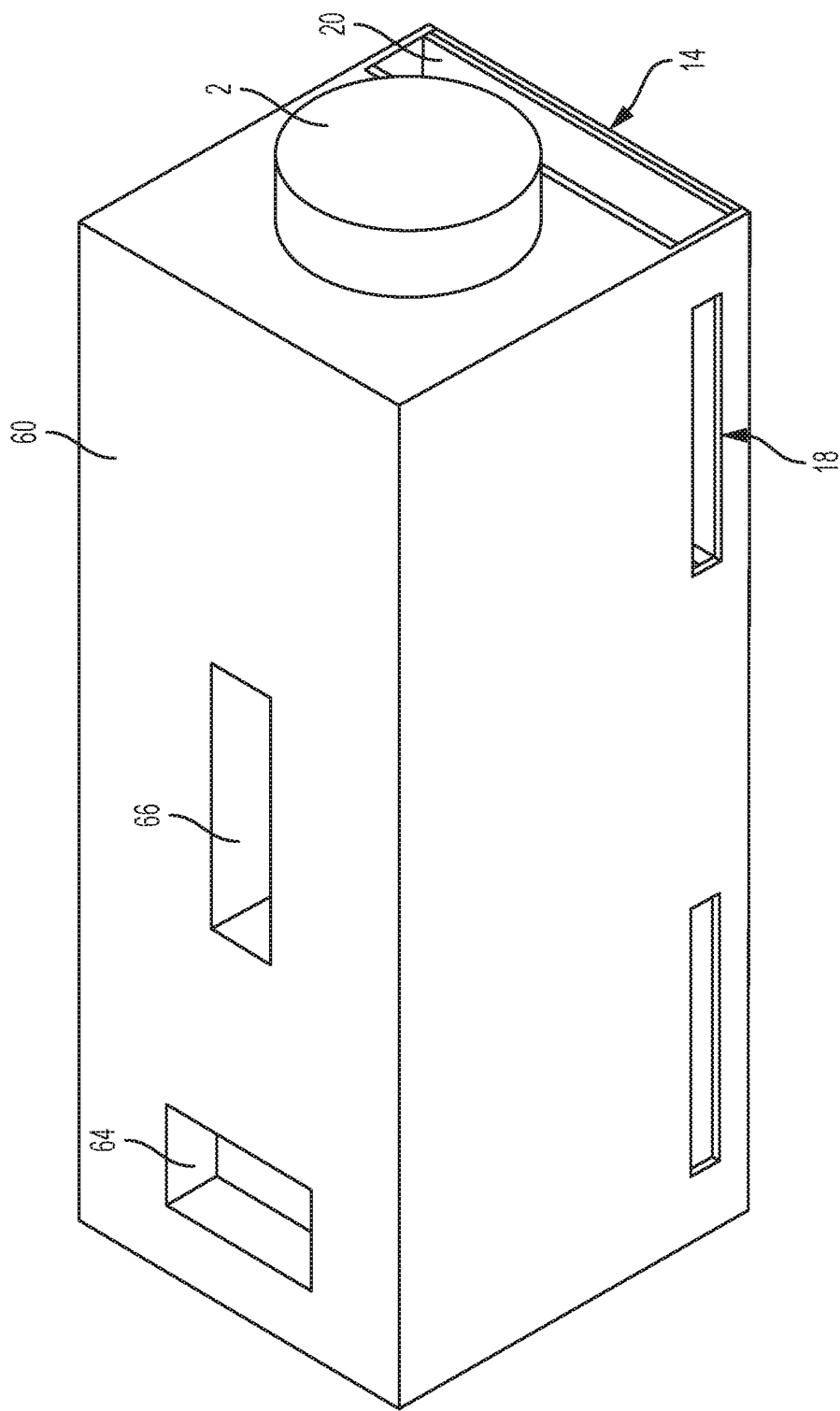
FIGS. 13A illustrates an outside view and 13B illustrates an inside view of an example of a tick trap.
Figure 13B:
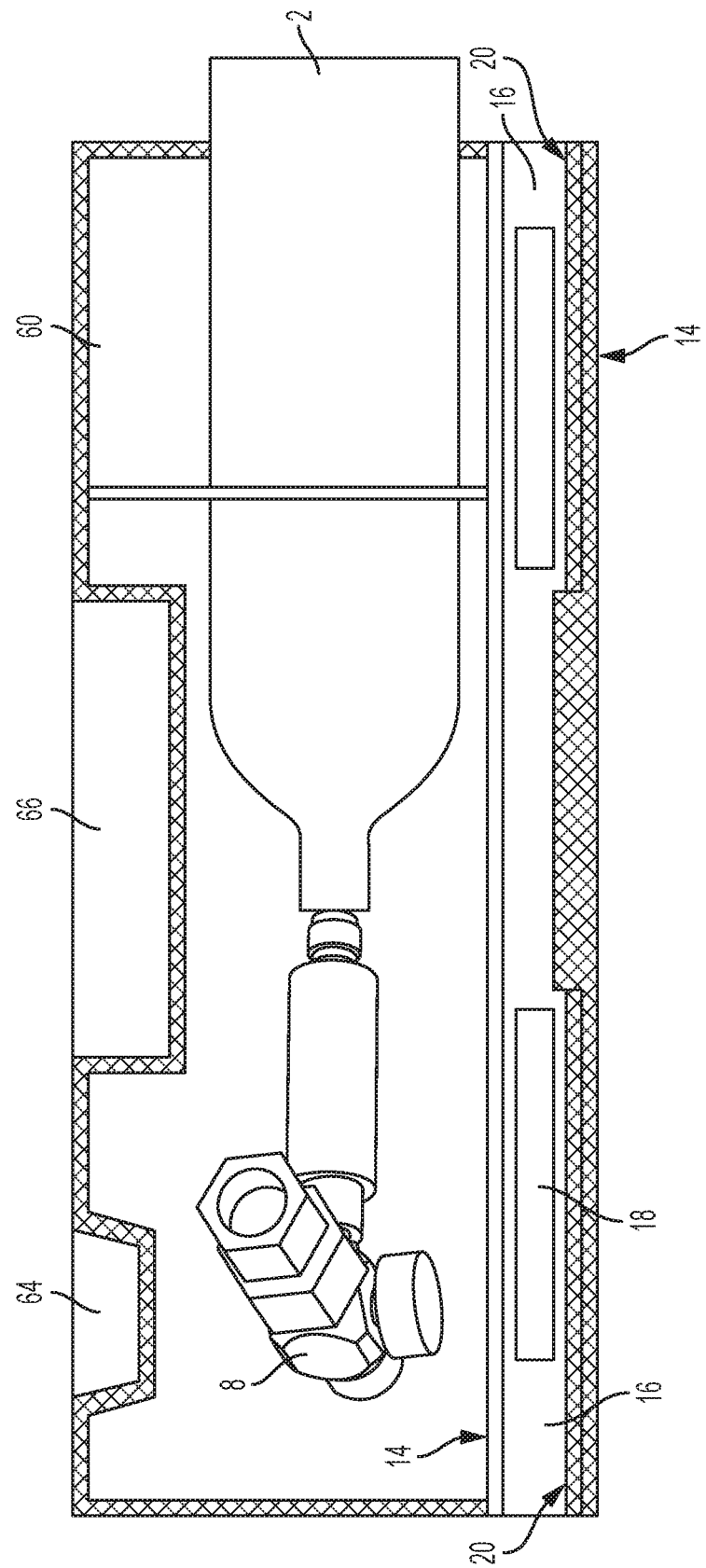

FIGS. 13A and 13B illustrate an example of a self contained tick trap 60 having a housing 14 defining the tick trapping chamber 16 and openings 18 in the housing through which the ticks can enter the chamber 16. The canister 2 is located above the chamber 16. Sticky surfaces 20 (glue) can be present in the chamber 16. The trap 60 can have a handle 66 for carrying. The trap 60 can also have an additional attractant 64 as described below. The glue 20 can in form of a removable glue trap 22 that can be replaced by the user so that the housing 14 can be reused. FIG. 12C also illustrates the use of multiple openings 18 into the tick trapping chamber 16.

Figure 14A:
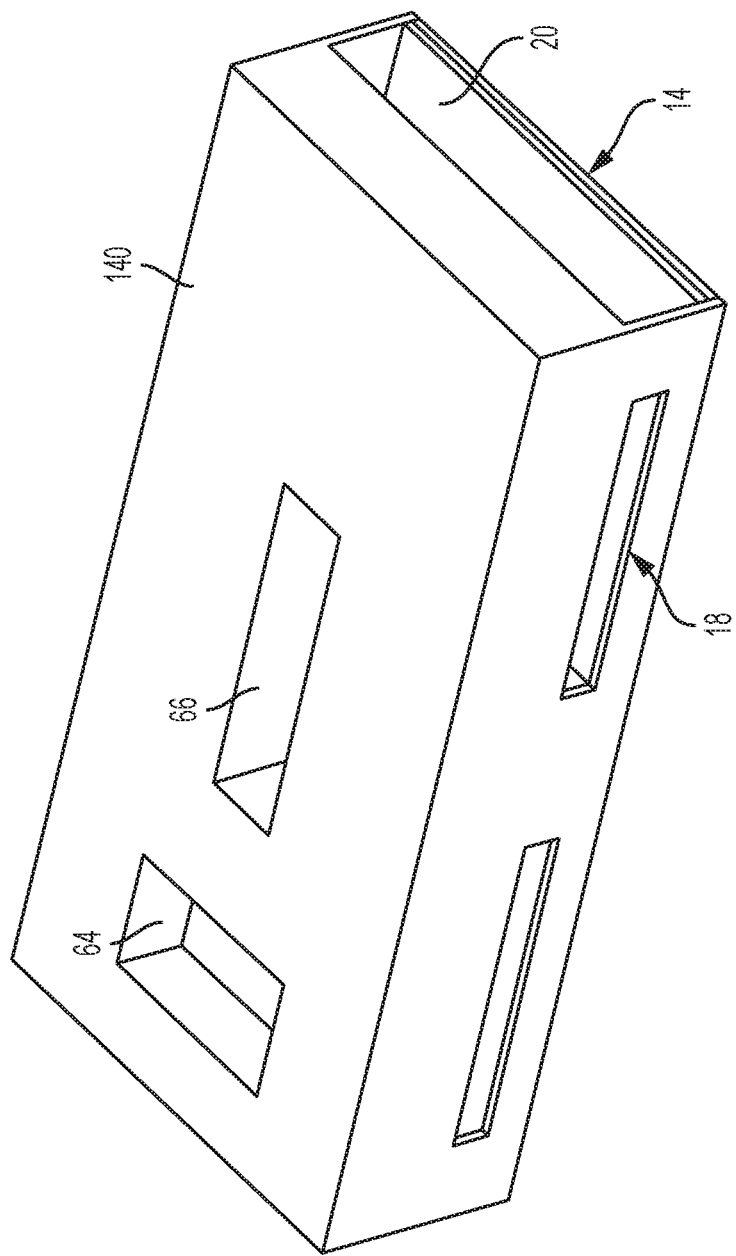
FIGS. 14A illustrates an outside view and 14B illustrates an inside view of an example of a tick trap.
Figure 14B:
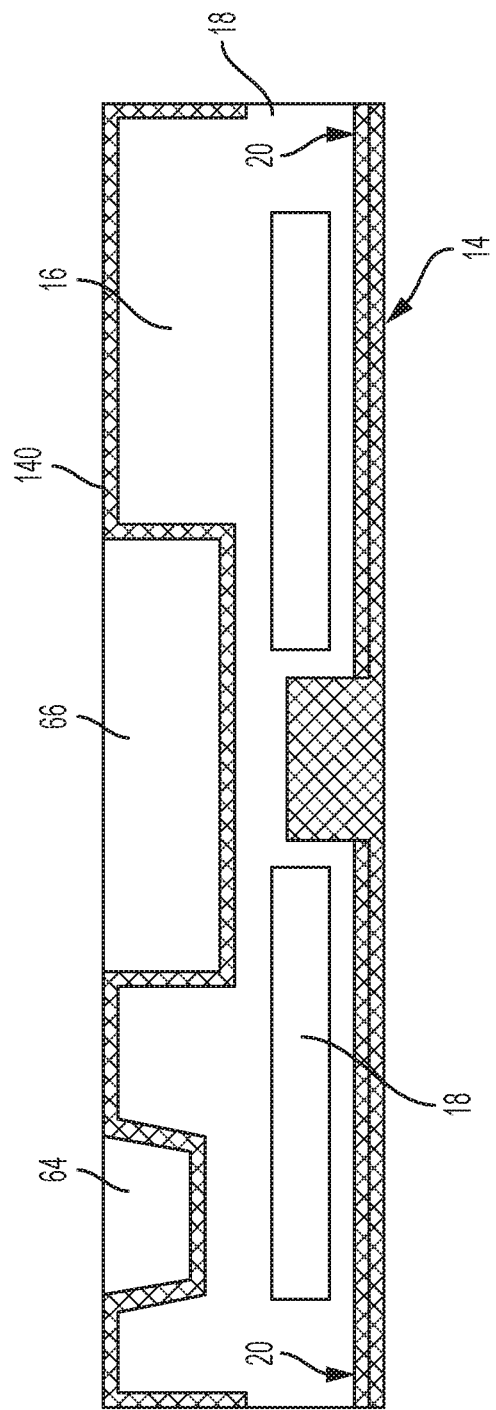

Another embodiment of the invention relates to trapping ticks using attractants 64 in place of the carbon dioxide attractant described herein as shown in FIGS. 14A and 14B or in addition to the carbon dioxide attractant as shown in FIGS. 13A and 13B.

A particularly preferred embodiment of the invention is the use of a plant based tick attractant in combination with a glue on a support. The term support includes any material to which the glue can be applied, including the housings, glue traps, and foldable traps described herein.

FIGS. 14A and 14B illustrate a preferred example of a tick trap 140 containing a tick attractant 64. The tick trap 140 has a housing 14 defining the tick trapping chamber 16 and openings 18 in the housing through which the ticks can enter the chamber 16. Sticky surfaces 20 (glue) can be present in the chamber 16. The trap 140 can have a handle 66 for carrying. Preferably the attractant 64 is not harmful to humans or other mammals. The attractant 64 can be included in the glue formulation 20 and/or added to the trap as shown at 64. The trap 140 preferably has housing 14 to protect the glue formulation 20 from the environment, especially rain. The glue 20 can in form of a removable glue trap 22 that can be replaced by the user so that the housing 14 can be reused.

The attractant 64 is preferably a natural plant scent, such as a tree scent or bush scent. The tree scent can be formed from an evergreen tree or deciduous tree as desired. Preferred tree scents are cedar and apple. Preferred bush scents are basil and peppermint, with basil being most preferred. The plant scent can be formed by grinding parts of the plant and using the ground up parts as an attractant in the glue and/or near the glue. The plant sent can also be formed by soaking a part of the plant, such as the leaves, bark and/or wood, in a solvent, such as water, to extract the plant scent from the plant parts. Any suitable solvent for dissolving or dispersing the plant scent from the plant can be utilized, such as hydrocarbons, alcohols, water, alkoxides, etc. The plant scent can be formed from one or more plants that grow in the area where the traps will be placed. Cedar and basil have been used to repel insects. Surprisingly, we have found that cedar and basil are effective attractant for ticks. Furthermore, essential oils of the plant can also be utilized as the plant based scent.

Preferably the attractant 64 is a plant based scent formed from a commonly consumed food commodity, such as a food based plant (edible plant). Non-limiting examples of such a food based plant scent are basil and apple, which are commonly consumed food commodities. The U.S. Environmental Protection Agency exempts food based plants from regulation in insect traps. Thus, preferably, the plant based scent is a food based scent that the FDA exempts from the FIFRA Registration. For example, preferred plant based scents for use as the attractant 64 meet the requirements under 40 C.F.R. Section 180.950 so that the plant based scents are exempted from the requirement of a tolerance under FFDCA section 408. Preferably, the entire trap is exempted from the requirement of a tolerance under FFDCA section 408.

To protect an area, the tick traps 140 can be placed around the perimeter, such as from 10 to 75 feet apart. The tick traps 140 can be used and placed in the same manner as the carbon dioxide tick traps 1 described herein. The tick traps 140 can be set in any room of a home, for example in where cloths are stored to attract and trap ticks that drop from cloths worn outside.

Figure 15:
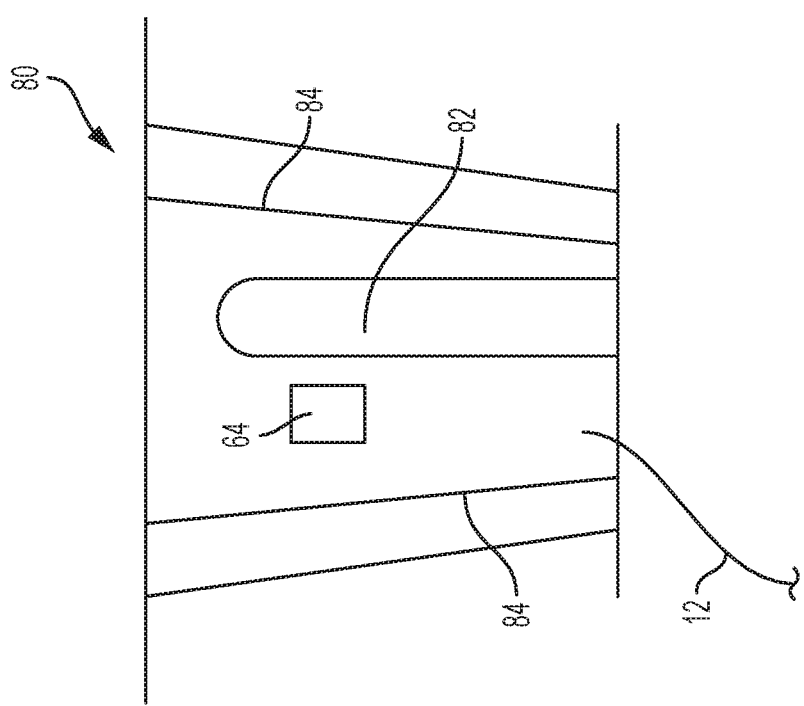
FIG. 15 illustrates a modified electrical insect shocker.

Electric shocking traps 80 typically utilize a light 82 to attract insects to the electrical shocking elements 84 to electrocute and kill the insects. As shown in FIG. 15, the electric traps 80 can now be modified by attaching a tube 12 to supply carbon dioxide to the electric shocking trap 80 to provide an additional attractant, carbon dioxide, to the trap 80. Alternatively, the attractants 64 described herein can be used in addition to the carbon dioxide or in place of the carbon dioxide.

EXAMPLE 19 glue traps were set up with different scents applied to them. The scents were made with an essential oil and water mixture and then sprayed liberally on the glue traps. The scents tested were ginger, vetiver, clove, spearmint, patchouli, grapefruit, lemongrass, nutmeg, lavender, basil, tea tree, ylang ylang, bergamot, eucalyptus, wintergreen, peppermint, frankincense, cypress, and cinnamon. These were tested many times over a 3 month period from March to May. Basil was the most successful at attracting ticks Cedar was also tested by soaking cedar branches and leaves in water. Cedar was successful at attracting ticks on numerous occasions. The testing area was in a mostly wooded area with some brush cover in Sauquoit, NY during the month of May. On one four day testing period rain occurred on two days, but basil and cedar were successful at attracting ticks. Weather conditions during testing varied between warm, cold, rainy, overcast, and sunny.

During that three-month time period, the following attractants in essential oil form did not adequately attract ticks in Sauquoit, New York, during the month of May: ginger, vetiver, clove, spearmint, datchouli, grapefruit, lemongrass, nutmeg, lavender, tea tree, ylang ylang, bergamot, eucalyptus, wintergreen, frankincense, and cypress. These plant based scents may work for other locations and/or times of the year.

Another example of a plant based scent can be made from crab apple leaves. When using a scent made from crab apple leaves in Sauquoit, New York, during the month of June, one glue trap trapped 10 ticks in less than 24 hours. Without being bound by any theory, I believe that the ticks are attracted to plants where mammals eat or forage. For example, deer are carriers of tick borne diseases such as Lyme disease. Deer like to eat the crab apples and leaves of the crab apple tree. Thus, I believe the ticks are attracted to the crab apple tree and wait to fall onto a deer eating the crab apples or leaves. During this same time, cedar scent was tested and collected 9 ticks in less than 24 hours. The term apple tree includes all forms of apple trees, such as crab apple trees.

Each of TomCat, RealKill, Catchmaster Max-Catch, and Catchmaster Roach & Insect glue traps were tested with basil leaves, crab apple leaves and cedar branches. The testing area was in a mostly wooded area with some brush cover in Sauquoit, NY during the months of May-July 2017. Basil leaves caught 3-4 ticks/24 hours. Crab apple leaves caught 3-10 ticks/24 hours. Cedar branches caught 1-6 ticks/24 hours.

Preferably, the traps having attractants and glue are free of ingredients that are toxic, poisonous, or harmful to humans or mammals, such as dogs, rabbits, hamsters, and cats. The glue is preferably inert, non-irritating and non-harmful (non-hazardous) to humans and mammals. The traps having attractants and glue can be made environmentally friendly and/or biodegradable, so the entire trap can be thrown away. Preferably, the trap is free of materials that are not biodegradable or are harmful to the environment.

Glues that are non-toxic, non-harmful, and non-irritating to humans and mammals are now well-known. Any commercially available glue that is non-toxic, non-harmful and non-irritating to humans and mammals can be utilized in the present invention. Examples of such glues are commercially available from Catchmaster, Tomcat, D-CON, and Scotts.

The housing of the tick trap is preferably formed from a biodegradable material. Even more preferable, the material is water-resistant. Suitable materials are now well-known. For example, biodegradable, water-resistant packaging materials can be utilized, such as those commercially sold by www.begreenpackagingstore.com, www.packagingzone.net, www.polymateltd.com, www.nanotechindustries.com, etc. In this regard, the trap preferable is formed from a cellulosic material, such as paper, that can have a water repellant coating thereon. For example, a GreenCoat (Nanotech Industries Inc.) can be used to provide good water resistance to cellulose material. Microorganisms can decompose these materials and then the material can be converted into carbon dioxide, water and biomass while composting in wet soil.

When the biodegradable trap can be simply thrown away with the trapped ticks contained therein without harming the environment. If the trap will be used outside, the material selected is preferably water resistant so that the trap will resist degradation for at least a week, and preferable up to month when exposed to moisture or rain. If the trap is mistakenly left in the environment, the trap can decompose. In this manner, the trap can be utilized in the environment for a week without degrading and then simply discarded with the trapped ticks contained therein or allowed to decompose in place.

FIGS. 16A-16E illustrate an example of a preferred foldable, throw away trap according to the present invention. The foldable trap comprises a support 100 having the glue 20 applied to the support 100. The tick attractant 64 can be applied to the glue 20 or to the support 100 by the user. The support 100 can comprise a tab 102 and slot 104 sized to receive the tab 102. When the support is folded to form a housing, as shown in FIGS. 16 D and 16E, the tab 102 is inserted into the slot 104 to form a chamber 16 and opening 64. The foldable trap functions similar to commercially available foldable glue boards, such as those from Catchmaster, d-CON, or Tomcat, that can be folded to provide a housing. The conventional foldable traps can be utilized by modifying them to include the present tick attractant 64 and optionally by replacing the support 100 material with a biodegradable, moisture resistant material. Preferably, the packaging material holding multiple or single traps and the tick attractant 64 is also formed from a biodegradable material. The tick attractant 64 can be provided in a separate container 106 if desired. The user can remove the tick attractant 64 from the container 106 and place the tick attractant 64 on the glue 20 or support 100 and use the trap in open form, FIG. 16C or the support 100 can be folded to provide an enclosure, 16D and 16E. The open form can be used under a bed or in a closet and the enclosed, folded-form can be used outside or where humans or mammals may be exposed to the trap. Preferably, the tick attractant 64 is the plant based attractant described herein.

The biodegradable tick trap has many advantages over conventional traps. For example, the traps can be folded to form a protective enclosure, the plant based attractant installed in the enclosure, and then placed in the environment and left there. After trapping ticks and being exposed to the environment, such as moisture, the trap will eventually break down to create soil and the ticks will die after being trapped in the glue. Therefore, the traps do not even have to be removed. A large area can inexpensively be covered with no harm to the environment.

Any of the traps described herein, and especially the biodegradable traps, can be colored to blend into the environment they will be placed, such as green for foliage, brown for dirt, or any form of camouflage so that the traps are not unsightly.

During Aug. 17-24, 2017, the paper foldup traps Catchmaster were tested by adding plant based scents based on essential oils of basil, apple and cedar. The weather varied between 60-80 degrees F., and from sunny to rainy. The testing area was in a mostly wooded area with some brush cover in Sauquoit, NY during the months of May-July 2017. Basil trapped 6 ticks. Apple trapped 2 ticks. Cedar trapped 1 tick. Buck lure and doe lure were also tested but did not attract any ticks.

On Sep. 22, 2017, four tick traps like those shown in FIGS. 14A-B were set in a grassy area in Sauquoit, NY. Two of the traps utilized a combination of apple and apple seed essential oil and two of the traps utilized basil essential oil as the attractants. In less than 24 hours, each of the traps captured 5 ticks each on the glue. This result was very surprising in view of basil being widely known as a tick repellant. Merely placing traps without attractants and traps with other scents in the same area did not result in any ticks being trapped. Applicant has unexpectedly found that basil and other plant based scents are effective tick attractants, not repellents.

The present invention provides many advantages over previously tried tick traps. I could not locate any tick traps in the major stores, including Walmart, Lowe's and Home Depot. Tick borne diseases are a major problem. The present invention solves this problem by using novel methods and devices. The plant based scent in combination with a glue trap provides an environmentally and animal friendly solution to the tick problem.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of trapping ticks comprising:
   placing a tick trap at a location to trap ticks, the tick trap comprising:
   a support;
   a glue on the support, the glue is constructed to trap ticks touching the glue by sticking to the ticks; and
   a tick attractant comprising a plant based scent formed from basil; and,
   the plant based scent attracting ticks to the glue so that ticks contact the glue and become trapped by the glue.

2. The method according to claim 1, further comprising folding the support to provide a housing having inside surfaces defining a protective enclosure and at least one side opening, the glue being on at least one inside surface, and the housing being placed at a location surface so that ticks walk from the location surface through the at least one side opening directly into the protective enclosure and contact the glue.

3. The method according to claim 2, wherein the glue is present at least on a bottom inside surface at a bottom of the housing.

4. The method according to claim 2, further comprising removing the tick attractant from a separate package and applying the tick attractant to the glue orthe housing.

5. The method according to claim 2, wherein the support is formed from a biodegradable material and the method further comprises placing the trap in an environment where the trap will be exposed to moisture and the trap decomposing when exposed to the moisture.

6. The method according to claim 5, wherein the trap is colored to blend in with the environment.

7. The method according to claim 1, further comprising providing a housing having at least one side opening and inside surfaces defining a protective enclosure, the support having the glue thereon is constructed to be removably inserted within the protective enclosure, and placing the housing having the support inserted therein at a location surface so that ticks walk from the location surface through the at least one side opening directly into the protective enclosure and contact the glue.

8. The method according to claim 7, wherein the glue is at a bottom of the housing.

9. The method according to claim 1, wherein the location is in a dwelling.

10. The method according to claim 1, wherein the location is in a place where cloths are stored.

11. The method according to claim 1, further comprising placing a plurality of the tick traps around an area to provide a tick reduced protection area.

12. The method according to claim 1, wherein the trap is free of ingredients that are toxic, poisonous, or harmful to humans or mammals so that when the trap decomposes the environment will not be contaminated with a toxic, poisonous or harmful material.

13. The method according to claim 1, wherein the support is formed from a biodegradable material.

14. The method according to claim 13, wherein the biodegradable material contains a water resistant coating so that the trap can be utilized in the environment for at least a week before degrading.

15. The method according to claim 13, further comprising placing a plurality of traps in an area to trap ticks and allowing the traps to decompose.

16. The method according to claim 1, wherein the plant based scent comprises an extract from a part of a basil plant.

17. The method according to claim 1, wherein the plant based scent comprises an essential oil of basil.

18. The method according to claim 1, wherein the tick attractant is on the glue or incorporated into the glue.

19. A method of trapping ticks comprising:
folding a support to provide a housing having at least one side opening and inside surfaces defining a protective enclosure, a glue being on at least one inside surface, the glue is constructed to trap ticks touching the glue by sticking to the ticks, a tick attractant is incorporated in the glue, is on the glue, is on the support, or is on the housing, and the tick attractant comprising a plant based scent formed from basil;
placing the housing on a location surface to trap ticks; and
the plant based scent attracting ticks so that ticks walk from the location surface through the at least one side opening directly into the protective enclosure and contact the glue, wherein the glue traps the ticks.

20. The method according to claim 19, further comprising applying the plant based scent to the glue or the support.

21. The method according to claim 19, wherein the trap is free of ingredients that are toxic, poisonous, or harmful to humans or mammals so that when the trap decomposes the environment will not be contaminated with a toxic, poisonous or harmful material.

22. The method according to claim 19, wherein the support comprises a biodegradable material.

23. The method according to claim 22, wherein the biodegradable material comprises cellulose.

24. The method according to claim 22, further comprising placing a plurality of traps in an area to trap ticks and allowing the traps to decompose.

25. The method according to claim 24, wherein the traps are colored to blend into the area.

26. The method according to claim 19, further comprising placing a plurality of traps in an area to trap ticks.

27. The method according to claim 19, wherein the plant based scent comprises an extract from a part of a basil plant.

28. The method according to claim 19, wherein the plant based scent comprises an essential oil of basil.

29. The method according to claim 19, wherein the tick attractant is on the glue or incorporated into the glue.

30. A method of trapping ticks comprising:
providing a housing having at least one side opening and inside surfaces defining a protective enclosure;
providing a support constructed to be removably inserted into the housing, a glue being on the support, the glue is constructed to trap ticks touching the glue by sticking to the ticks, a tick attractant is incorporated in the glue, is on the glue, is on the support, or is on the housing and the tick attractant comprising a plant based scent formed from basil;
placing the housing on a location surface to trap ticks; and
the plant based scent attracting ticks so that ticks walk from the location surface through the at least one side opening directly into the protective enclosure and contact the glue, wherein the glue traps the ticks.

31. The method according to claim 30, further comprising applying the plant based scent to the glue or the support.

32. The method according to claim 30, wherein the trap is free of ingredients that are toxic, poisonous, or harmful to humans or mammals so that when the trap decomposes the environment will not be contaminated with a toxic, poisonous or harmful material.

33. The method according to claim 30, wherein the plant based scent comprises an extract from a part of a basil plant.

34. The method according to claim 30, wherein the plant based scent comprises an essential oil of basil.

35. The method according to claim 30, wherein the tick attractant is on the glue or incorporated into the glue.

* * * * *